United States Patent [19]

Lamont

[11] Patent Number: 4,732,350
[45] Date of Patent: Mar. 22, 1988

[54] AIRCRAFT WHEEL ROTATION APPARATUS

[76] Inventor: John S. Lamont, 3-333 Broadway, Winnipeg, Manitoba, Canada, R3C 0T1

[21] Appl. No.: 795,890

[22] Filed: Nov. 7, 1985

[51] Int. Cl.$^4$ ............................................. B64C 25/40
[52] U.S. Cl. ................... 244/103 S; 416/142; 416/197 A
[58] Field of Search ................ 244/103 S; 416/142, 416/143, 117, 119, 197 A, DIG. 8

[56] References Cited

U.S. PATENT DOCUMENTS

| 24,300 | 6/1859 | Harris | 416/142 |
|---|---|---|---|
| 835,667 | 11/1906 | Donnelly | 416/143 |
| 1,835,018 | 12/1931 | Darrieus | 416/119 |
| 2,410,625 | 11/1946 | Branner | 244/103 S |
| 2,666,604 | 1/1954 | Davis | 244/103 S |
| 3,692,427 | 9/1972 | Risse | 416/143 |
| 4,264,279 | 4/1981 | Derenz | 416/197 A |

FOREIGN PATENT DOCUMENTS

| 892130 | 10/1953 | Fed. Rep. of Germany ... 416/DIG. 8 |
|---|---|---|
| 3241908 | 5/1984 | Fed. Rep. of Germany ... 244/103 S |

Primary Examiner—Galen Barefoot
Attorney, Agent, or Firm—Burns, Doane, Swecker & Mathis

[57] ABSTRACT

An aircraft wheel rotation assembly is mountable on the rim of an aircraft wheel and includes a plurality of vanes which are equally spaced around the rim. Each vane has a generally radially aligned airfoil shaped cross section so that when a passing air current impinges on the vanes, each vane contributes a positive torque to rotate the associated wheel through an angle of more than 180 degress about the wheel axis. The vanes may be deployable and retractable, in which case each vane also has an integral segment gear which meshes with a ring gear carrried by the assembly. Rotation of the ring gear, which may be done hydraulically, moves the vanes in unison from a fully retracted position toward a fully extended position.

5 Claims, 10 Drawing Figures

AIRCRAFT WHEEL ROTATION APPARATUS

BACKGROUND AND SUMMARY OF THE INVENTION

The present invention relates generally to devices for establishing prerotation of aircraft wheels during landing operations. More particularly, the invention is directed to extendable and retractable devices for use in prerotation of aircraft wheels.

In the years since aviation has become widespread both as a leisure activity and as a commercial activity, it has been known that during landing operations aircraft tires experience rather severe duty cycles. For example, it will be readily observed that as an aircraft wheel first touches the ground during a landing, it is in a non-rotating condition relative to the aircraft. Yet the aircraft itself can be moving relative to the ground at a speed of 50-250 miles per hour, depending on the nature and size of the aircraft. More particularly, the landing speed of an aircraft is a function of its weight to lift ratio. For example, a small fighter may have a higher landing speed than a large cargo plane. As the aircraft wheel touches down, it must begin to rotate at an angular velocity such that its tangential speed matches the speed of the aircraft relative to the ground.

During the time interval required for the wheel to attain that angular velocity, the tire skids on the runway pavement. That skidding leads to loss of material from the tire itself as well as to generation of considerable heat generated by friction between the tire and the runway. The result of that skidding is extremely short duty life for aircraft tires. That short life is even further abbreviated as the size of the aircraft increases. And with larger aircraft, the tires themselves become even more expensive than with smaller aircraft.

Steps which will reduce the severity of the aircraft tire duty cycle will increase the useful life of the aircraft tire. Concomitantly, there is a substantial economic benefit since larger, more expensive aircraft tires can be used for longer periods of time without replacement. Accordingly, apparatus which can accomplish this goal is economically desirable.

In addition, skidding of aircraft tires on the surface of runways causes a layer of rubber to accumulate on runway surfaces. This layer must be removed periodically, since accumulations can affect traction on landing, can cause hydroplaning under wet conditions, and can damage jet engines if pieces of the layer become dislodged and are ingested by jet engines on takeoff. The need to remove rubber layers adds to the expense of airport operations and aircraft landing fees.

In the past, various proposals have been advanced which attempt to deal with the landing stress imposed on aircraft tires. For example, it has been proposed to use cup-shaped devices attached to both sides of an aircraft wheel to get aircraft wheels rotating before the aircraft itself touches down. See, U.S. Pat. No. 2,339,241, issued to Davis on Jan. 18, 1944 and U.S. Pat. No. 4,040,582, issued to Krauss on Aug. 9, 1977. Such arrangements were not satisfactory, however, since the permanent arrangement of the devices on the aircraft wheel caused increased drag on the aircraft leading to less economical operation, and under some circumstances, reduced speed and greater required distance for take-off.

To reduce the drag exerted by the prerotation device, it has been proposed to make the devices retractable during flight of the aircraft. One such concept used a Bowden wire cable that was actuated by the pilot to control the position of the retractable devices. See, U.S. Pat. No. 2,397,319, issued to Johnson, Jr., on Mar. 26, 1946.

Effective prerotation is accomplished by imparting torque to the aircraft wheel. That torque is enhanced when the resistance of a device moving forwardly relative to the aircraft is less than the resistance of the device moving rearwardly relative to the aircraft. Devices which move in and out in response to wind pressure in order to change their drag characteristics have been proposed for permanent attachment to an aircraft wheel, as have devices made of flexible materials. See, U.S. Pat. No. 2,435,459, issued to Oden on Feb. 3, 1948 and U.S. Pat. No. 2,941,758, issued June 21, 1960 to R. Cordoba. Such devices, however, cause unbalanced dynamic forces to operate on the wheel structure due to the changes in position. Since unbalanced dynamic forces lead to vibrations, devices which cause them are undesirable.

It has also been recognized that wheel prerotation devices are more effective as they extend beyond close proximity to the aircraft wheel. Thus, devices have been suggested in which springs as well as fluid pressure, project cup-shaped members outwardly from the wheel. See, U.S. Pat. No. 2,666,604, issued to Davis on Jan. 19, 1954.

In a somewhat similar vein, it has been recognized that wheel prerotation devices are more effective when operating at large diameters. As a result it has been proposed to move the radial location of devices to near the periphery of the tire to enhance rotation efficiency.

Generally speaking, the prerotation devices heretofore available provide torque to rotate the aircraft wheel by virtue of the differences in drag available at the top and the bottom of the rotation cycle. When the devices are in line with one another, they do not contribute to the wheel rotation torque. Thus, those devices do not exert a driving force on the wheel through an angle greater then 180 degrees.

Furthermore, the known devices do not provide a mechanism for controlling deployment of the prerotation element so that the position of all elements is uniform. And, it is important to provide the ability to regulate the amount of deployment of wheel rotation devices so that the aircraft wheel will not exceed the angular velocity necessary to match ground speed of the aircraft.

According to the present invention, wheel prerotation vanes are provided which have an airfoil shape in cross section. These vanes are oriented such that the chord line of the airfoil section is aligned to be radial or at a small angle relative to a radius of the wheel. As a result the natural concavity of the airfoil section provides a greater drag when the vane is located at the bottom of the wheel than when the vane is located at the top of the wheel. But, when the airfoil sections are aligned, each creates a lift force. The lift force of the forward vane is directed vertically downwardly whereas the lift force of the rearward vane is directed vertically upwardly. Thus, a significant contribution to the wheel rotation torque is accomplished throughout the various rotational positions of the vanes around the wheel.

The vanes are preferably inclined so as to be swept backward away from the direction of wheel rotation.

This arrangement provides a reduction in the aerodynamic drag acting on vane when the vane passes around the top portion of the wheel since the backward sweep reduces the drag coefficient for the vane. Moreover, the backward sweep increases the drag coefficient for the vane as it passes around the bottom portion of the wheel since the vane presents more of a cup like surface to the passing airstream. This combination of aerodynamic effects augments the rotational effect of the vanes of the present invention in comparison to vanes which are not backwardly swept.

When it is desired that the vanes be deployable, an hydraulic system may be provided to control deployment as well as to control retraction of the vanes. This hydraulic system is operable to position the vanes at continuous increments between a fully retracted position and a fully deployed position.

So that the deployable vanes will be uniformly positioned, means may be provided to simultaneously deploy and retract the vanes. One suitable device is a unison ring which engages arcuate gears on each of the vanes.

BRIEF DESCRIPTION OF THE DRAWINGS

Many objects and advantages of the present invention will be apparent to those skilled in the art when this specification is read in conjunction with the attached drawings wherein like reference numerals are applied to like elements and wherein.

DESCRIPTION OF THE PREFERRED EMBODIMENTS

Figure 1:
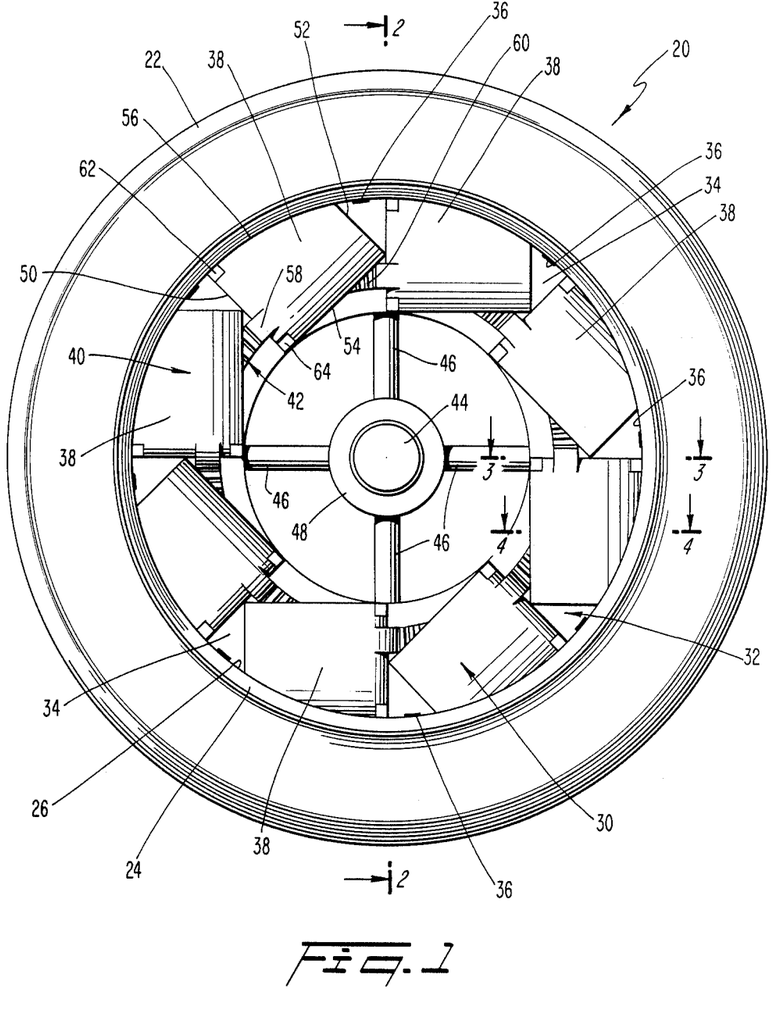
FIG. 1 is a side elevational view of an aircraft wheel provided with a prerotational device in accordance with the present invention.

With reference to FIG. 1, an aircraft wheel assembly 20 is shown with a prelanding wheel rotation device 30 installed. The aircraft wheel assembly 20 is a conventional arrangement in which an aircraft tire 22 is mounted on an aircraft wheel 24. The aircraft wheel 24 is typically made from steel or another suitable metal material. At the circumferential portion of the aircraft wheel 24, there is a rim that defines a generally cylindrical surface 26. This rim receives and supports the radially inner portion of the aircraft tire 22. In addition, the cylindrical surface 26 of the rim provides lateral width to the aircraft wheel 24 to accommodate the lateral depth of the aircraft tire 22.

Positioned inside the cylindrical surface 26 and attached to the aircraft wheel 24 in a suitable conventional manner is the prelanding rotation device 30. With this location, the prelanding rotation device 30 can have a retracted position that does not protrude beyond the plane of the outer side surface of the aircraft tire 22. As a result, the prelanding rotation device 30 has a relatively minimal affect on drag forces acting on the associated aircraft.

The prelanding rotation device 30 includes an attachment means 32 for securely connecting the prelanding rotation device 30 to the rim of the aircraft wheel 24. The attachment means 32 includes a plate 34 which is preferably fabricated from a strong, lightweight material such as aluminum. The attachment means 32 has a generally annular shape with an outer diameter which is slightly less than the diameter of the cylindrical surface 26 of the aircraft wheel 24. With this arrangement, the plate 34 can be received within the cylindrical surface 26. The inner diameter of the plate 34 is selected so that the attachment means 32 can support the inner end of each of a plurality of vanes 38 in the vane means 40 carried by the attachment means 32. In addition, the plate 34 includes an annular slot located near the radially inner edge. This slot accommodates part of a synchronous actuation means 42 that is also carried by the attachment means 32 and which engages the vane means 40.

Any suitable means may be used to attach the plate 34 to the aircraft wheel 24. For example, the plate 34 may be welded to the aircraft wheel 24 at a plurality of circumferentially spaced locations 36. Alternatively, it may be desirable to use threaded fasteners to effect the attachment of the plate 34 to the aircraft wheel 24.

At the center of the aircraft wheel assembly 20 is the support shaft 44 connected to the aircraft and to which the entire aircraft wheel assembly 20 is rotatably connected. Surrounding the support shaft 44 is a generally annular manifold collar 48 which exchanges hydraulic fluid with the main aircraft hydraulic system. Extending between the manifold collar 48 and the plate 34 are a plurality of generally radially disposed double acting hydraulic cylinders 46.

As shown in FIG. 1, there may be four double acting hydraulic cylinders 46 which are equiangularly spaced around the support shaft 44. These double acting hydraulic cylinders 46 are also part of the synchronous actuation means 42. The radially inner end of each of the double acting hydraulic cylinders 46 may be attached to the manifold collar 48 while the radially outer end of each of the double acting hydraulic cylinders 46 may be attached to the plate 34 in any suitable conventional manner. With this arrangement, the double acting hydraulic cylinders 46 will be securely fixed in the aircraft wheel assembly 20.

While the present invention is illustrated with four double acting hydraulic cylinders 46, it should be noted that there may be as few as two double acting hydraulic cylinders 46, depending on the actuating forces that will be required to operate the vane means 40. In any event, there should be at least two double acting hydraulic cylinders 46 so that the aircraft wheel assembly 20 can be dynamically balanced.

The vane means 40 includes a plurality of vanes 38. As shown in FIG. 1, preferably eight vanes 38 are provided. As the vanes 38 are identical to one another, it will suffice to describe just one of the vanes 38 in detail. Each vane 38 includes a bottom edge 50 which, when the vane 38 is connected to the plate 34, extends generally radially with respect to the support shaft 44. In addition, each vane 38 includes a top edge 52 that is generally parallel to the bottom edge 50 but which has a length that is less than the length of the bottom edge 50.

Extending between the bottom edge 50 and the top edge 52 is a radially inner edge 54 and a radially outer edge 56. The radially inner edge 54, the radially outer edge 56, the top edge 52 and the bottom edge 50 define the outer shape of each vane 38. It will be noted that the radially outer edge 56 is curved as it extends from the bottom edge 50 to the top edge 52. The radius of curvature of the radially outer edge 56 is slightly less that the radius of the cylindrical surface 26 adjacent to the vane 38. With this relationship, the vane 38 can be placed in a first position that is generally in the plane of the aircraft wheel 24 (see FIG. 2).

Each vane 38 also includes an arcuate gear 58 which extends beyond the bottom edge 50 of the vane. The arcuate gear 58 is positioned so as to be in meshed engagement (see FIG. 5) with a ring gear 60 that is part of the synchronous actuation means 42. Accordingly, circumferential movement of the ring gear 60 will cause rotation of the arcuate gear 58 and the associated vane 38. Moreover, by arranging all of the vanes to mesh with the ring gear 60 at the same orientation, the ring gear 60 acts as a unison ring to assure that each vane 38 moves through the same arc as each other vane 38 when the ring gear 60 is displaced circumferentially. By appropriate design, the arcuate gear 58 teeth can be discontinued at a point on the vane 38 where the vane 38 will be oriented at an angle of up to 90° from the plane of the plate 34. Preferably, the angle will lie in the range of 45° to 60°. Thus, the vane 38 is operable to move between a first position (FIG. 1) where the vanes 38 is generally parallel to the plate 34 and a second position 62 (FIG. 2) where the vane 38 is substantially elevated so as to project outwardly from the plate 34.

In order to pivotally attach each vane 38 to the plate 34, the bottom edge 50 of each vane 38 is notched at each end (FIG. 1) to receive a corresponding lug 62, 64 which is integral with the plate 34. Each lug 62, 64 is provided with a bore (FIG. 3), and the bores of the two lugs 62, 64 are coaxially aligned and sized to receive a vane pivot shaft 66. The vane pivot shaft 66 extends between and through the two lugs 62, 64. In addition, the vane pivot shaft 66 extends through a portion of the bottom edge 50 of the vane 38 which is disposed between the two lugs 62, 64. As a result, the vane pivot shaft 66 defines a generally radial axis about which the corresponding vane 38 can rotate.

Figure 4:
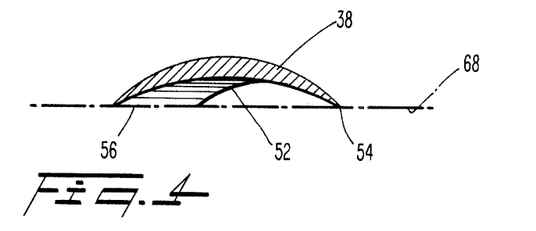
FIG. 4 is a partial cross-sectional view taken along the line 4—4 of FIG. 1.
Figure 7:
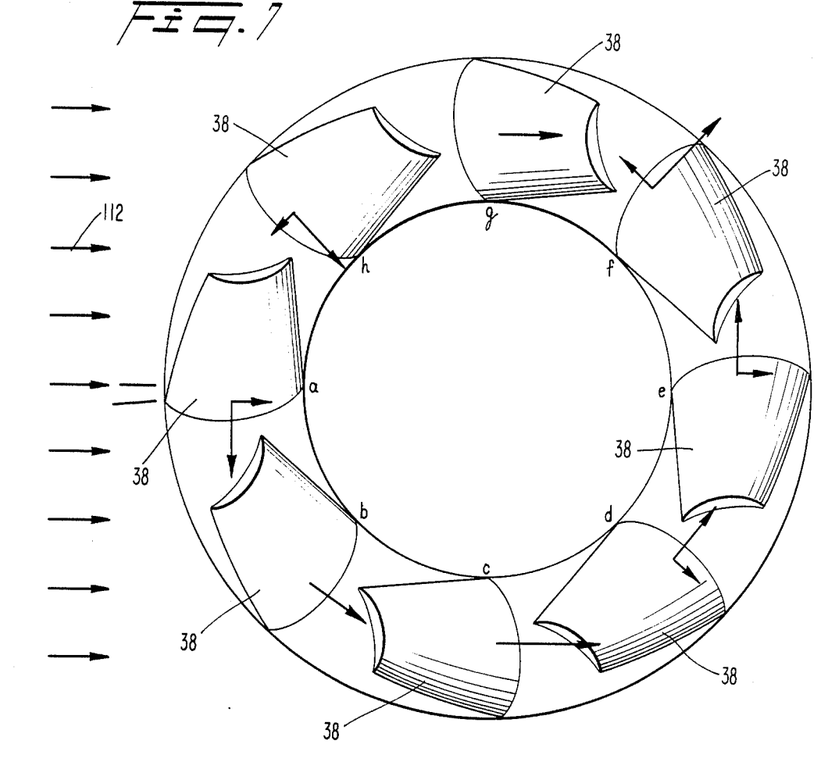
FIG. 7 is a schematic illustration of the forces generated by the vanes in various radial positions on the wheel.

As most clearly seen in FIG. 4, the cross section of each vane 38 has the shape of an airfoil. In fact, the cross section is asymmetric with respect to a chord line 68. This asymmetry coupled with the airfoil shape contributes significantly to the efficiency with which the vane 38 acts to drive the aircraft wheel assembly 20. With reference to FIG. 7, the vanes 38 may be positioned on the wheel assembly so that a chord line passing through the radially innermost edge of the airfoil section and through the radially outermost edge of the airfoil section has an acute angle relative to a radial line extending from the center of the wheel. That vane arrangement creates a positive angle of incidence that places the radially outermost edge of the airfoil section ahead of the radially innermost edge of the airfoil section as the wheel rotates.

In this connection, it is noted that since the vanes 38 are expected to operate a comparatively low velocities, the airfoil sections preferably have a relatively thick section. This is because thicker airfoils provide greater lift forces at lower fluid velocities. Futhermore, it is anticipated that optimization studies of the airfoil shape, size, angle of incidence, and other operating parameters may refine the vane characteristics shown in the attached figures.

Figure 8:
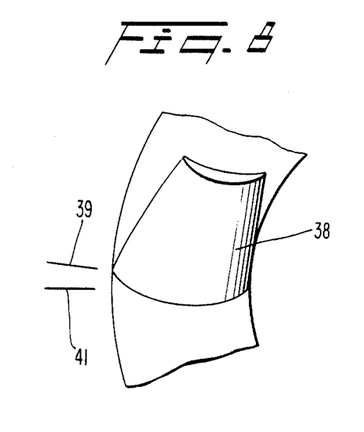
FIG. 8 is a schematic illustration of one of the vanes, similar to FIG. 7, having a negative angle of incidence with respect to a radial line.
Figure 9:
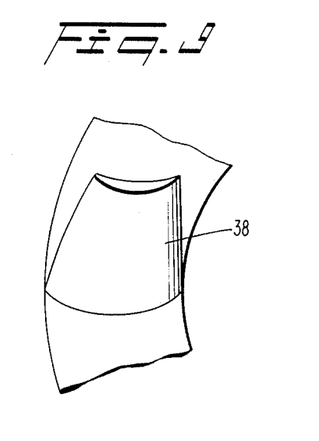
FIG. 9 is a schematic illustration of one of the vanes, similar to FIGS. 7 and 8, which is radially oriented.

While the vanes 38 may be provided with a positive angle of incidence as shown in FIG. 7, it is also contemplated that the vanes may have a slight negative angle of incidence between the chord line 39 (FIG. 8) and the radial line 41. Moreover, it is also contemplated that circumstances may exist where it is desirable for the vanes 38 to be positioned with the chord line parallel to a radial line (FIG. 9).

In order to mount the ring gear 60 for circumferential movement relative to the plate 34 (FIG. 3), the plate 34 may be provided with a plurality of circumferentially spaced guides 70. The guides 70 may be formed integrally with the plate 34 and are equally spaced from one another in the circumferential direction around the ring gear 60. A suitable conventional retainer 72 may be provided so as to sandwich the ring gear 60 between the retainer 72 and the plate 34 in a rotatable fashion.

Figure 3:
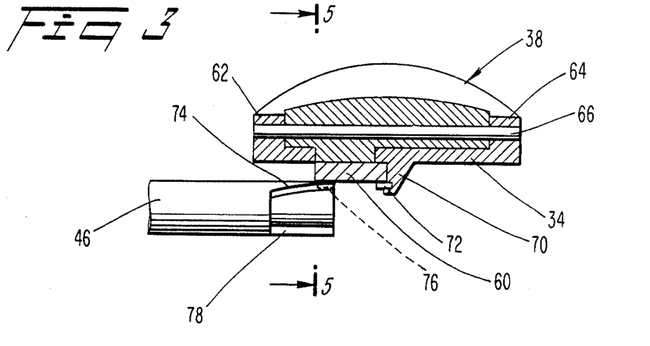
FIG. 3 is a partial cross-sectional view taken along the line 3—3 of FIG. 1.
Figure 5:
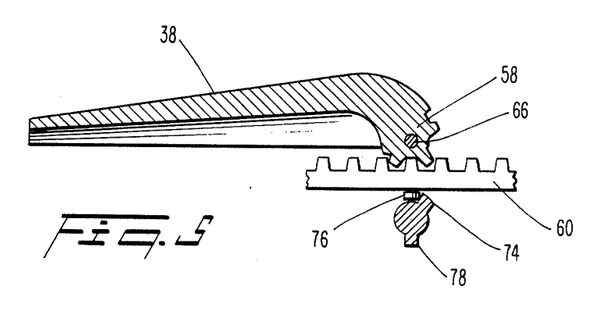
FIG. 5 is a partial cross-sectional view taken along the line 5—5 of FIG. 2, in enlarged scale.

To actuate the ring gear 60 circumferentially in a controlled manner, piston rod of each of the double acting hydraulic cylinders 46 is provided with a helical cam 74 which engages a corresponding cam follower 76 on the side of the ring gear 60 and rigidly attached to the ring gear 60. (FIG. 3 and FIG. 5). To prevent the piston rod from rotating about its longitudinal axis, the piston rod of each double acting hydraulic cylinder 46 is also provided with a straight spline 78 on the side opposite from the helical cam 74. The straight spline 78 is constrained in any suitable conventional manner to prevent rotation of the piston rod about its axis as the piston rod extends and retracts. Accordingly, when the piston rod of each double acting hydraulic cylinder 46 is extended, cooperation between the helical cam 74 and the cam follower 76 causes the ring gear 60 to move in one circumferential direction. And, when the piston rod of each double acting hydraulic cylinder 46 is retracted, cooperation between the helical cam 74 and the cam follower 76 causes the ring gear 60 to move in a second circumferential direction which is oppositely directed to the first circumferential direction.

Hydraulic fluid to actuate the double acting hydraulic cylinders 46 can be supplied directly by the main aircraft hydraylic system by feeding hydraulic fluid lines through the strut 80 (FIG. 2) which supports the aircraft wheel assembly 20. An hydraulic fluid supply line 82 delivers hydraulic fluid to a supply port 84 which passes radially through the wall of the support shaft 44. In radial alignment with the supply port 84 is a supply manifold 86 which extends circumferentially around the support shaft 44 on the inner wall of the manifold collar 48. From the supply manifold 86, a cylinder supply port 88 is provided for each of the double acting hydraulic cylinders 46. Each cylinder supply port 88 extends through the manifold collar 48 from the cylinder end of the corresponding double acting hydraulic cylinder 46. Since the supply manifold 86 extends around the manifold collar 48, fluid communication between the cylinder end of each double acting hydraulic cylinder 46 and the hydraulic supply line 82 is maintained regardless of the rotational position of the aircraft wheel relative to the support shaft 44.

In a similar manner, an hydraulic return line 90 is disposed within the strut 80 such that is connects with a return port 92 extending through the support shaft 44. The return port 92 is in continuous radial alignment with a return manifold 94 in the inside wall of the manifold collar 48. This return manifold 94 extends circumferentially through an angle of 360 degrees so that there is continuous fluid communication between the manifold collar 48 and the return port 92. Extending radially through the wall of the manifold collar 48 is a cylinder return port 96 which provides fluid communication between the surface of the manifold collar 48 and the return manifold 94. A cylinder return 98 connects the rod end of each double acting hydraulic cylinder 46 to a corresponding one of the cylinder return ports 96. Accordingly fluid communication between the hydraulic return line 90 and the rod end of each double acting hydraulic cylinder 46 is maintained regardless of the rotational position of the aircraft wheel relative to the support shaft 44. Control of the double acting hydraulic cylinders 46 can be effected from any convenient place on the associated aircraft. For example, control can be accomplished from the cockpit by the pilot. The pump 100 (FIG. 6) of the primary aircraft hydraulic system can deliver pressurized hydraulic fluid from the main hydraulic reservoir 102 to a suitable conventional three position four-way hydraulic valve 104. The broken line 106 can be considered to be the interface between the aircraft and the aircraft wheel assembly. Accordingly, the hydraulic supply line 82 is connected to one port of the valve 104. In addition, the hydraulic return line 90 is connected to a second port of the valve 104. By connecting the pump 100 to a third port and the reservoir 102 to a fourth port of the valve 104, control of the extension and retraction of the double acting hydraulic cylinders 46 as well as a neutral hydraulically locked condition can be achieved from a single location on the aircraft.

It is, of course, possible that there may be applications for a wheel rotation device according to the present invention in which the cost or the weight of the actuation or deployment system described above are unsuitable. Moreover, in small and light aircraft where lighter wheel assemblies experience less severe duty cycles than in heavy aircraft, considerably less force or effort is needed to provide the desired rotation speed within an acceptable time period.

Figure 10:
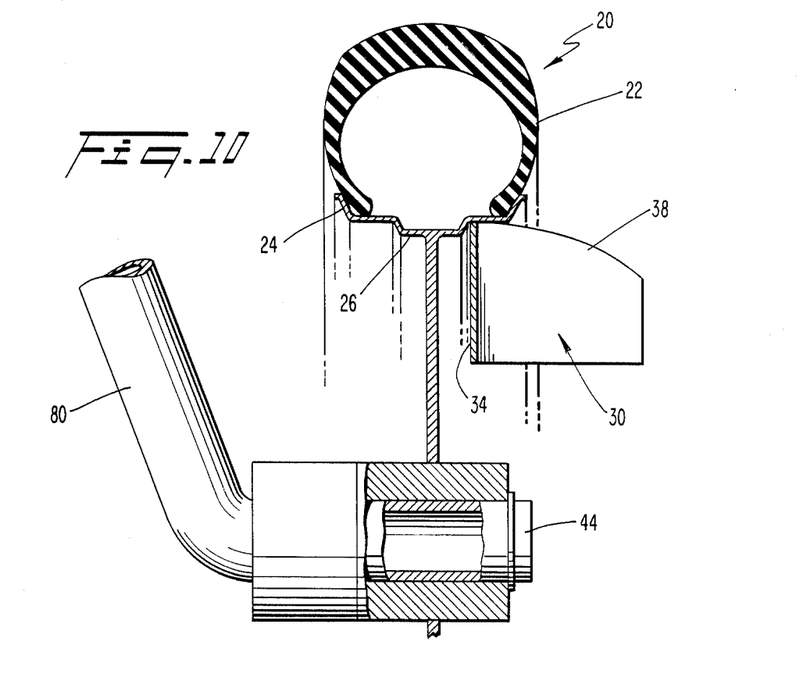
FIG. 10 is a view similar to FIG. 2 of vanes which are fixedly mounted.

In these various situations, it is within the scope of the present invention to use the generally radially oriented airfoil-shaped vanes of the present invention without providing a mechanism for deploying and retracting those vanes. For example, it is possible to simply fix the vanes 38 (FIG. 10) in the desired operating position relative to the plate 34. The airfoil shape of these vanes can be optimized in a known conventional manner to provide the desired lift effect and the rotational torque to give the wheel assembly the desired rotational speed at landing. It is quite possible that fixed vanes would protrude beyond the plane of the aircraft tire by a distance which is less than the deployable vanes discussed above yet still provide the positive rotational effect to aircraft wheels.

OPERATION

Figure 6:
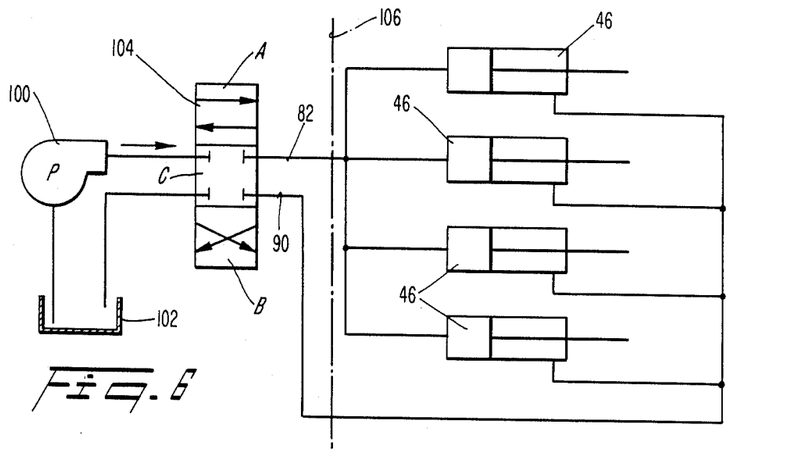
FIG. 6 is a schematic illustration of a suitable hydraulic circuit for deployment of the vanes.

During normal flight operation of an aircraft having deployable vanes, the position of the vanes 38 in the prelanding rotation device 30 is generally not changed. Accordingly, the hydraulic valve 104 is allowed to remain in the neutral position C (FIG. 6). In this position, there is no fluid communication through the hydraulic valve 104 and neither side of the double acting hydraulic cylinders 46 receives hydraulic fluid. Moreover, neither side of the double acting hydraulic cylinders 46 can expel any hydraulic fluid. Under such circumstances, the positon of the piston rods in the double acting hydraulic cylinders 46 is fixed or hydraulically "locked" since the hydraulic fluid is incompressible.

Since the position of the double acting hydraulic cylinders 46 is fixed, the ring gear 60 is likewise fixed at a specific circumferential position. Thus, the arcuate gear 58 and the associated vanes 38 are also fixed at one position. During most of the time that an airplane is operating, the vanes 38 will be in the fully retracted position shown in FIG. 1.

Figure 2:
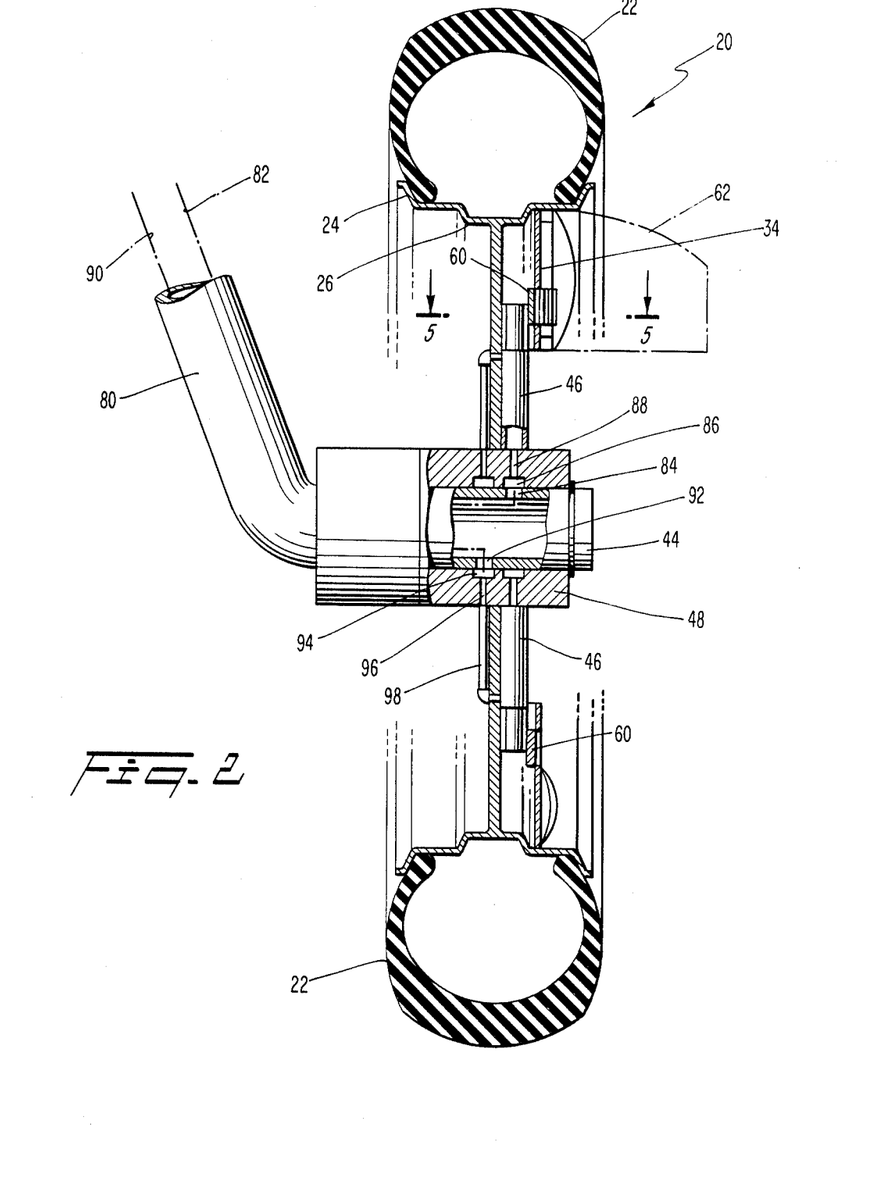
FIG. 2 is a partial cross-sectional view taken along the line 2—2 of FIG. 1.

During preparation for landing, however, retractable landing gear is extended and locked. Then the vanes 38 of the prelanding rotation device 30 must be extended from the storage position to an extended position 62 (FIG. 2). To accomplish extension of the vanes 38, the hydraulic valve 104 (FIG. 6) is moved from the neutral position C to the vane extension position A. Upon actuation of the hydraulic valve 104, fluid communication is established between the pump 100 and the hydraulic supply line 82 as well as between the hydraulic return line 90 and the reservoir 102. Thus hydraulic fluid from the pump 100 passes through the hydraulic valve 104 into the hydraulic supply line 82 and is delivered to the supply port 84. Due to the fluid communication between the supply port 84 and the cylinder side of each double acting hydraulic cylinders 46, hydraulic fluid also enters the cylinder side of each double acting hydraulic cylinder 46 causing the piston to be extended radially outwardly.

As the piston of each double acting hydraulic cylinders 46 moves radially outwardly, the piston expels hydraulic fluid from the rod side of the associated double acting hydraulic cylinder 46. The hydraulic fluid thus expelled passes through the cylinder return 98 to the manifold collar 48, through the cylinder return port 96, the return manifold 94 and the return port 92 to the hydraulic return line 90. From the hydraulic return line 90, the fluid passes through the hydraulic valve 104 (FIG. 6) to the reservoir 102. As long as the hydraulic valve 104 is maintained in position A and the piston does not reach the end of its stroke in the double acting hydraulic cylinder 46, hydraulic fluid will be delivered to the double acting hydraulic cylinder 46 and returned from the double acting hydraulic cylinders 46 as just described.

When the pistons of the double acting hydraulic cylinders 46 are thus moving radially outwardly, the helical cam 74 (FIG. 5) attached to the piston will urge the associated cam follower 76 to move the ring gear 60 in the first circumferential direction. As the ring gear 60 begins to move, the meshed engagement between the ring gear 60 and the arcuate gear 58 of the vanes 38 causes the vanes 38 to rotate about the shaft 66 toward the position illustrated at 62 (FIG. 2).

At any time during this extension of the double acting hydraulic cylinders 46, the hydraulic valve 104 can be returned to the neutral position C (FIG. 6). In the event that this movement of the hydraulic valve 104 should occur, then the vanes 38 will be held at the corresponding intermediate position relative to the plate 34 by the hydraulic lock in the double acting hydraulic cylinders 46 and the mechanical lock resulting from the helical cam 74, cam follower 76, and the meshed relationship of the ring gear 60 and the arcuate gear 58.

To retract the vanes 38 from either the position 62 (FIG. 2) or an intermediate position toward the storage position (FIG. 1), the hydraulic valve 104 is moved from the neutral position C (FIG. 6) to the retracting position B. In this position of the valve, the hydraulic return line 90 is connected to the pump and now becomes a supply line for delivering hydraulic fluid to the double acting hydraulic cylinders 46; conversely, the hydraulic supply line 82 is connected to the reservoir 102 and becomes a return line for dumping hydraulic fluid from the double acting hydraulic cylinders 46. As a result, the rod end of the double acting hydraulic cylinders 46 is pressurized causing the piston to retract radially into the cylinder and simultaneously causing hydraulic fluid to be expelled from the cylinder end of the double acting hydraulic cylinder 46 and be sent back to the reservoir 102.

Moreover, with the hydraulic supply line 82 and the hydraulic return line 90 connected as indicated, the piston retracts causing the helical cam 74 (FIG. 5) to push the cam follower 76 in the opposite circumferential direction. As a result, the ring gear 60 rotates the arcuate gear 58 in a counterclockwise direction as seen in FIG. 5 so that the vanes 38 move toward the storage position. As was the case during extension of the vanes 38, if during retraction the hydraulic valve 104 (FIG. 6) is returned to the neutral position C, then the vanes 38 will be held in a position spaced from the storage position.

It will thus be seen that with hydraulic actuation, the vanes 38 can be positioned at the storage position of FIG. 2, the fully extended position 62, or at any intermediate position. Moreover, since the vanes 38 can be partially extended or partially retracted from any position except the extreme positions, the vanes 38 can be adjusted from the aircraft to any desired position.

Furthermore, since the prelanding rotation device 30 is rotationally balanced, there is no vibration problem that might result from unbalanced dynamic forces. And, the ring gear 60 provides the desired unison in operation of the vanes 38 during deployment and return.

With the vanes 38 deployed to the extent necessary to protrude beyond the plane 110 (FIG. 2) of the sidewall of the aircraft tire, vanes 38 are exposed to the passing fluid current of air. And, in the case of the fixed position vanes (FIG. 10), the vanes are likewise positioned to be exposed to the passing fluid current of air. For convenience in visualizing the effect of the airfoil shaped vanes 38 on the forces acting to rotate the aircraft wheel assembly 20, it is convenient to discuss the sequence of events as the vanes 38 move around the axis of the support shaft 44.

With reference now to FIG. 7, the vane 38 in position a behaves as an airfoil. As the air passes over the vane 38, the vane 38 experiences a lift force which is directed in the circumferential counterclockwise direction.

As the vane 38 moves to position b, the vane 38 continues to behave as an airfoil but with an increasing angle of attack relative to the airstream 112. Thus the lift force directed in the counterclockwise direction increases even further.

When the vane 38 moves toward position c, the vane 38 ceases to behave as an efficient airfoil and begins to act like a cup shaped member which traps substantial wind pressure to exert a force which is virtually entirely directed in the counterclockwise direction.

Moving from position c to position d, the airfoil again begins to function to generate a lift force in the direction of rotation—counterclockwise. However, the airfoil section now resembles a wing which is flying backward.

As the vane 38 moves from position d to position e, the airfoil cross section continues to exert a circumferentially directed force tending to move the aircraft wheel 24 in the counterclockwise direction.

At some point between position d and position f, the airfoil section passes through the angle of attack where the airfoil section gives no lift. Continued movement of the vane 38 toward the position f results in the vane exerting a force clockwise tending to retard rotational movement of the aircraft wheel 24.

Now when the vane 38 moves from the position f to the position g, the convex contour of the advancing surface is engaged by the air current. That convex surface presents a significantly lower resistance to the air current that the diametrically opposed vane at position helical cam 74. Consequently, there is a net torque exerted on the aircraft wheel assembly 20 in the counterclockwise direction.

Moving from position g toward position h, the resistance of the vane 38 decreases. And, as the vane 38 moves from position h toward position a, the vane 38 passes through the zero lift angle of attack for the radially outside edge of the vane 38. As a result, the vane 38 again operates as an airfoil experiencing ever increasing angles of attack.

From the foregoing discussion it can be seen that due to the cross-sectional configuration of the vanes 38 as asymmetrical airfoils, the vanes 38 operate to exert counterclockwise rotational torques on the aircraft wheel assembly 20 through an angle which substantially exceeds 180 degrees. Moreover, since the vanes 38 function as conventional airfoils through a significant part of their rotation about the central axis of the support shaft 44, they operate to enhance to effectiveness of the wheel prerotation during landing.

It is also within the contemplation of this invention that a wheel speed sensing device could be used to determine whether the aircraft wheel 24 is rotating at the proper speed to match aircraft ground speed. A suitable device could be monitored by the copilot, for example. By judicious adjustment of the control valve 104, the position of the vanes relative to the wheel can then be adjusted to assure that relative motion between the aircraft wheel 24 and the runway is minimized as the aircraft lands. Alternately, the copilot could selectively apply the aircraft brakes even while the plane is still airborne to adjust the rotational speed of the aircraft wheels to the proper value for landing.

Moreover, should it be desired for any reason e.g., for balancing considerations, it is also within the contemplation of the present invention to provide a set of airfoil shaped vanes on the opposing side of the aircraft wheel so as to further increase the torque exerted to rotate the wheel prior to landing. In this connection, however, it is noted that there may well be beneficial effects which result if the airfoil shape vanes are only provided on the outboard sides of the aircraft wheel assemblies.

More specifically, when the aircraft experiences a cross wind landing the pilot typically lands with the aircraft attitude being yawed into the direction from which the crosswind is blowing. The wheel on the upwind side of the aircraft (i.e., in the direction from which the cross wind is blowing) will operate essentially as previously described. On the other hand, the wheel on the downwind side of the aircraft (i.e., in the direction from which the cross wind is blowing) will be partially shielded by the effect of the crosswind. That shielding will decrease the efficacy of the vanes on the downwide wheel with the result that the downwind wheel will not spin as fast as the upwind wheel. As a result, when the aircraft touches down on the runway, the difference in rotation between the downwind wheel and the upwind wheel will help the pilot straighten the aircraft to the runway.

It will now be apparent that a wheel prerotation device has been disclosed which overcomes problems of the type dicussed above in connection with prior devices. Moreover, it will be apparent to those skilled in the art that there are numerous modifications, variations, substitutions, and equivalents for features of the invention which do not materially depart from the spirit and scope of the invention. Accordingly, it is expressly intended that all such modifications, variations, substitutions, and equivalents which fall within the spirit and scope of the invention as defined by the appended claims be embraced thereby.

What is claimed is:

1. Apparatus for causing an aircraft wheel assembly to rotate in response to air passing by comprising:
   attachment means for securing the apparatus to an aircraft wheel;
   vane means for imparting rotational force on the attachment means in response to a fluid current, the vane means being carried by the attacment means and including a plurality of equiangularly disposed vanes positioned around the attachment means, being moveable between a first position and a second position, and being operable to exert a circumferentially directed force component through an angle of more than 180 degrees; and
   synchronous actuation means carried by the attachment means and engaging the vane means for moving the vane means between the first position and the second position and for maintaining the vane means at any intermediate position between the first position and the second position;
   wherein the synchronous actuation means includes a ring gear mounted on the attachment means so as to be circumferentially moveable; and
   wherein each vane includes an arcuate gear arranged to mesh with the ring gear so that circumferential movement of the ring gear simultaneously moves each vane between the first position and the second position.

2. Apparatus for causing an aircraft wheel assembly to rotate in response to air passing by comprising:
   attachment means for securing the apparatus to an aircraft wheel;
   vane means for imparting rotational force on the attachment means in response to a fluid current, the vane means being carried by the attachment means and including a plurality of equiangularly disposed vanes positioned around the attachment means, being moveable between a first position and a second position, and being operable to exert a circumferentially directed force component through an angle of more than 180 degrees;
   synchronous actuation means carried by the attachment means and engaging the vane means for moving the vane means between the first position and the second position, the synchronous actuation means including a ring gear mounted on the attachment means so as to be circumferentially moveable; and
   a radially actuated member which engages the ring gear to move the ring gear in a circumferential direction, each vane including an arcuate gear arranged to mesh with the ring gear so that circumferential movement of the ring gear simultaneously moves each vane between the first position and the second position.

3. The apparatus of claim 2 wherein radially outward movement of the radiallly actuated member moves the ring gear in a first circumferential direction and radially inward movement of the radially actuated member moves the ring gear in a second direction opposite to the first direction.

4. The apparatus of claim 2 wherein the radially actuated member is continuously operable between a first and a second position such that the vanes can be moved between their first and second positions and can be stopped at any intermediate position.

5. The apparatus of claim 2 wherein the radially actuated member is hydraulically driven so as to be lockable in any position.

* * * * *